(12) United States Patent
Broussard et al.

(10) Patent No.: US 8,392,906 B2
(45) Date of Patent: *Mar. 5, 2013

(54) ENABLING PARALLEL WEBSPHERE RUNTIME VERSIONS

(75) Inventors: Scott J. Broussard, Austin, TX (US); Pralhad D. Galagali, Bangalore (IN); Dhandapani Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,506

(22) Filed: Apr. 10, 2012

(65) Prior Publication Data

US 2012/0198433 A1    Aug. 2, 2012

Related U.S. Application Data

(63) Continuation of application No. 12/465,282, filed on May 13, 2009.

(51) Int. Cl.
*G06F 9/44* (2006.01)
*G06F 9/445* (2006.01)

(52) U.S. Cl. ........ 717/170; 717/168; 717/169; 717/174; 717/175

(58) Field of Classification Search .......................... None
See application file for complete search history.

(56) References Cited

U.S. PATENT DOCUMENTS

| | | | |
|---|---|---|---|
| 7,398,523 B2 | 7/2008 | Martin et al. | |
| 7,657,533 B2 | 2/2010 | Gold et al. | |
| 7,779,406 B2 | 8/2010 | Blanding et al. | |
| 2003/0018959 A1* | 1/2003 | Wallman et al. | 717/148 |
| 2005/0022175 A1* | 1/2005 | Sliger et al. | 717/169 |
| 2005/0114408 A1 | 5/2005 | Gold et al. | |
| 2006/0265708 A1 | 11/2006 | Blanding et al. | |
| 2007/0113225 A1 | 5/2007 | Felts | |
| 2009/0183150 A1* | 7/2009 | Felts | 717/173 |
| 2010/0293537 A1 | 11/2010 | Broussard et al. | |

FOREIGN PATENT DOCUMENTS

| | | |
|---|---|---|
| GB | 2423168 A | 8/2006 |
| WO | 2008131456 A1 | 10/2008 |

OTHER PUBLICATIONS

IBM, System and Method for Managing Java Runtime Environments, Jul. 17, 2007, ip.com prior art database, IP.com No. IPCOM000154896D, all pages.*

"System and Method for Managing Java Runtime Environments," Technical Disclosure, IBM Corporation, www.ip.com, Jul. 17, 2007, 4 pages.

International Search Report, dated Aug. 16, 2010, regarding Application No. PCT/EP2010/056457, 3 pages.

Office Action regarding U.S. Appl. No. 12/465,282, dated Aug. 2, 2012, 20 pages.

* cited by examiner

*Primary Examiner* — Chun-Kuan Lee
*Assistant Examiner* — Ronald Modo
(74) *Attorney, Agent, or Firm* — Yee & Associates, P.C.; David A. Mims, Jr.

(57) ABSTRACT

A computer implemented method, a tangible storage medium, and a data processing system build a runtime environment of a system. A profile manager receives a service request containing a profile identifier. The profile identifier specifies a required version of at least one software component. The profile manager identifies a complete installation of the software component, and at least one delta file. The profile manager dynamically constructs a classpath for the required version by preferentially utilizing files from the at least one delta file followed by files from the complete installation. The runtime environment is then built utilizing the classpath.

8 Claims, 7 Drawing Sheets

ENABLING PARALLEL WEBSPHERE RUNTIME VERSIONS

This application is a continuation of application Ser. No. 12/465,282, filed May 13, 2009, status pending.

BACKGROUND OF THE INVENTION

1. Field of the Invention

The present invention relates generally to the data processing field and, more specifically, to a computer implemented method, apparatus and computer program product for building a runtime environment of a system containing a plurality of different versions of at least one software component.

2. Description of the Related Art

When an enterprise application server (EAS) in a production system is updated, most fix pack installation software will completely upgrade the enterprise application server as a whole. In particular, all the profiles or server runtimes are upgraded to the latest fix pack version, and they will all run at the same enterprise application server fix pack level. There are no provisions to install and maintain different fix pack versions in the same machine.

Assume, for example, that an enterprise application server base version, for example, an IBM WebSphere® Application Server (WAS) version 6.1, is being installed on a system. Assume also that three different runtime environments (REs), for example, WAS profiles X, Y and Z, exist on the enterprise application server, and that there are also three different applications: deployed on the X, Y and Z profiles, for example, TEST1 on profile X, TEST2 on profile Y, and TEST3 on profile Z. Assume also that it is it required to upgrade the EAS from one version to another, for example, from WAS version 6.1 to WAS version 6.1.0.25, only for application TEST2 deployed on runtime environment Y, and that it is not required to upgrade the EAS for the other applications. The upgrade, in fact, might even have a negative impact to one or both of applications TEST1 and TEST3. For example, application TEST1 may have been developed specifically to use the interface provided by IBM WebSphere® Application Server version 6.1.

Current patch upgrades for enterprise applications generally upgrade the complete enterprise application server. There are no provisions to upgrade only one or more particular runtime environments of an enterprise application server so that different runtime environments can run at different fix pack levels which are relevant to the applications deployed on the runtime environments. Current runtime environments also require that the base enterprise application server be running and completely rely on the base enterprise application server files. They do not have an option of selecting the version of interest, for example, profile X, which exists on system s1 may want to run on IBM WebSphere® Application Server 6.1, whereas profile Y on the same system s1 may want to run on IBM WebSphere® Application Server 6.1.5.

BRIEF SUMMARY OF THE INVENTION

According to one embodiment of the present invention, a computer implemented method, a tangible storage medium, and a data processing system are provided for building a runtime environment of a system. A profile manager receives a service request containing a profile identifier. The profile identifier specifies a required version of at least one software component. The profile manager identifies a complete installation of the software component, and at least one delta file. The profile manager dynamically constructs a classpath for the required version by preferentially utilizing files from the at least one delta file followed by files from the complete installation. The runtime environment is then built utilizing the classpath.

DETAILED DESCRIPTION OF THE INVENTION

Figure 1:
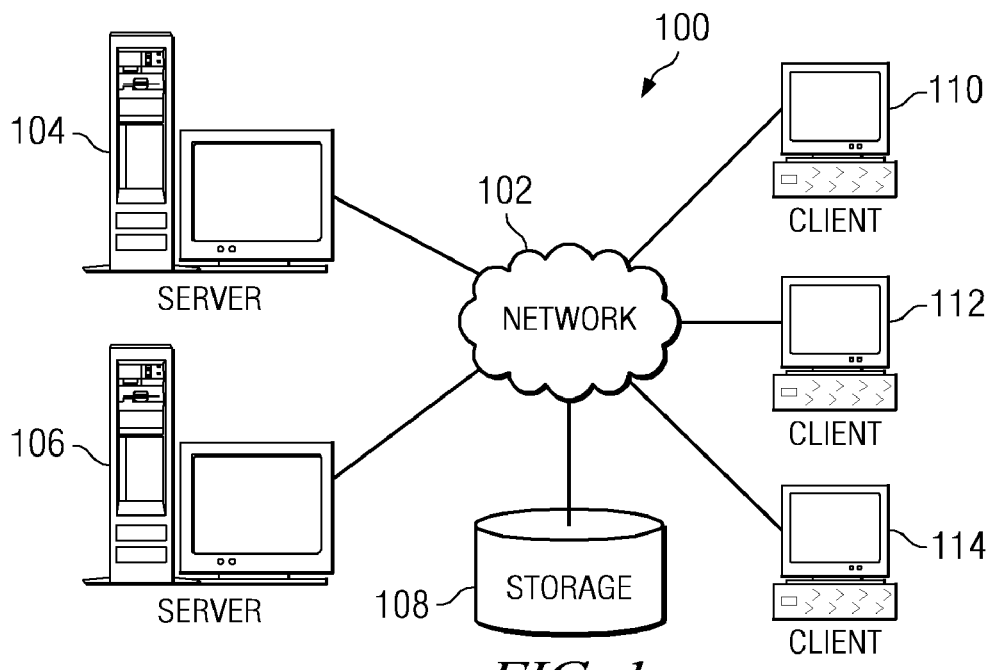
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but is not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java®, Smalltalk, C++ or the like and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
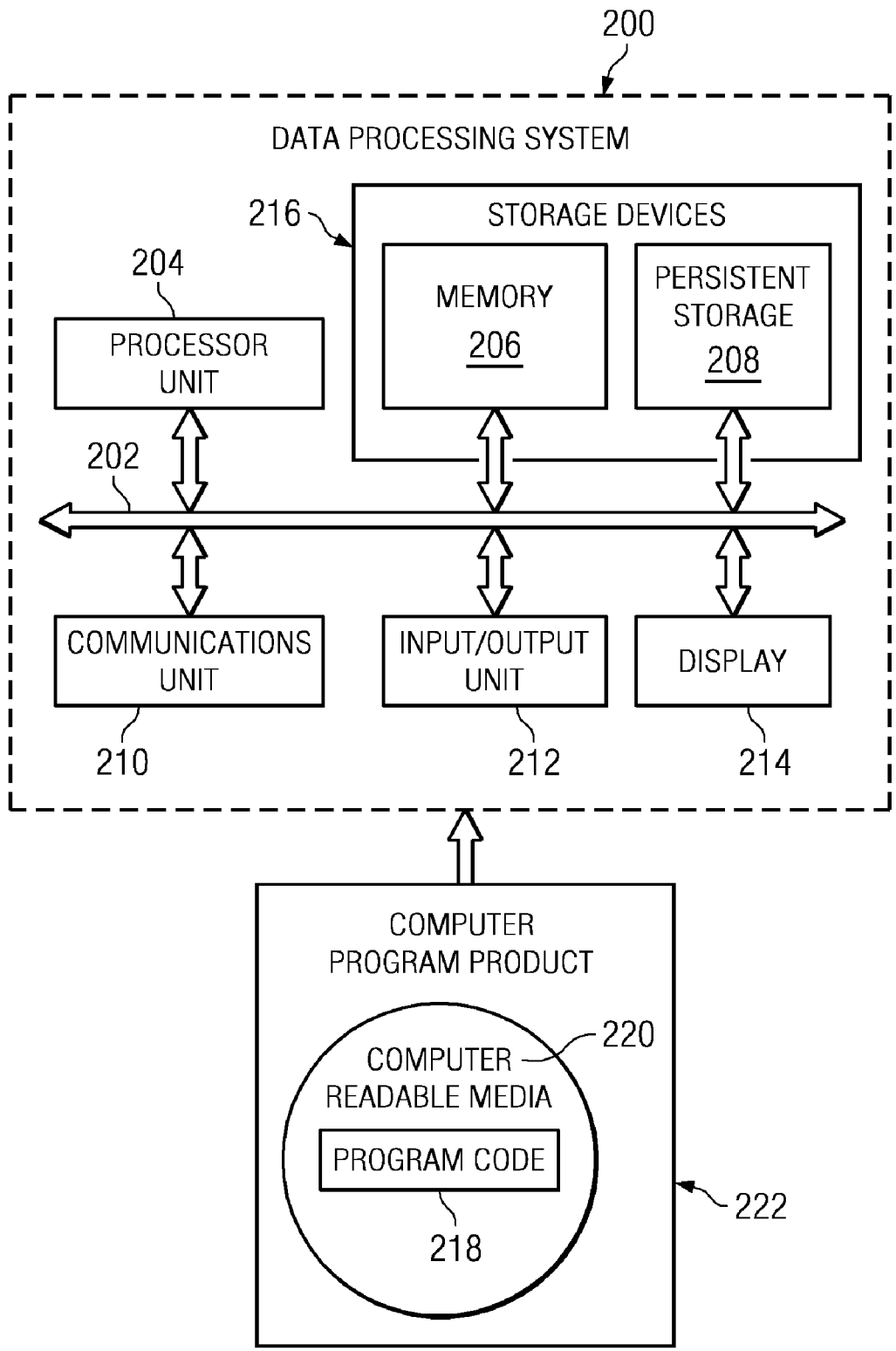
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
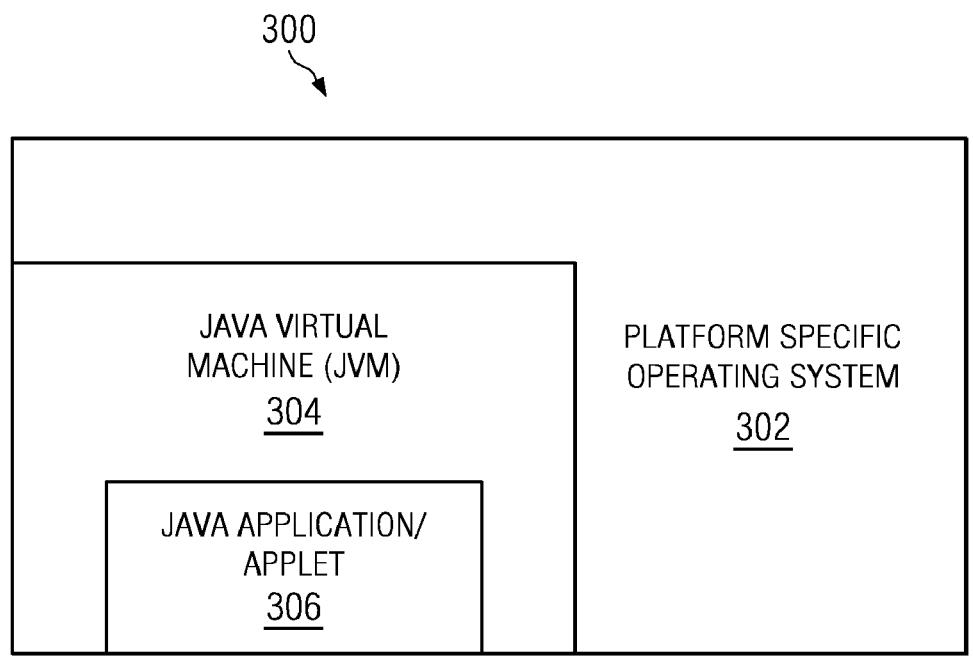
FIG. 3 is a block diagram illustrating the relationship of software components operating within a computer system that may implement the present invention.

With reference now to FIG. 3, a block diagram illustrates the relationship of software components operating within a computer system that may implement the present invention. Java®-based system 300 contains platform specific operating system 302 that provides hardware and system support to software executing on a specific hardware platform. Java® virtual machine (JVM) 304 is one software application that may execute in conjunction with the operating system. Java® virtual machine 304 provides a Java® run-time environment with the ability to execute Java® application/applet 306, which is a program, servlet, or software component written in the Java® programming language. The computer system in which Java® virtual machine 304 operates may be similar to data processing system 200 or computer 100 described above. However, Java® virtual machine 304 may be implemented in dedicated hardware on a so-called Java® chip, Java®-on-silicon, or Java® processor with an embedded picoJava core.

At the center of a Java® run-time environment is the Java® virtual machine, which supports all aspects of Java®'s environment, including its architecture, security features, and mobility across networks, and platform independence.

The Java® virtual machine is a virtual computer, for example, a computer that is specified abstractly. The specification defines certain features that every Java® virtual machine must implement, with some range of design choices that may depend upon the platform on which the Java® virtual machine is designed to execute. For example, all Java® virtual machines must execute Java® bytecodes and may use a range of techniques to execute the instructions represented by the bytecodes. A Java® virtual machine may be implemented completely in software or somewhat in hardware. This flexibility allows different Java° virtual machines to be designed for mainframe computers and PDAs.

The Java® virtual machine is the name of a virtual computer component that actually executes Java® programs. Java® programs are not run directly by the central processor but instead by the Java® virtual machine, which is itself a piece of software running on the processor. The Java® virtual machine allows Java® programs to be executed on a different platform as opposed to only the one platform for which the code was compiled. Java® programs are compiled for the Java® virtual machine. In this manner, Java® is able to support applications for many types of data processing systems, which may contain a variety of central processing units and operating systems architectures. To enable a Java® application to execute on different types of data processing systems, a compiler typically generates an architecture-neutral file format. This compiled code is executable on many processors, given the presence of the Java® run-time system. The Java® compiler generates bytecode instructions that are non-specific to a particular computer architecture. A bytecode is a machine independent code generated by the Java° compiler and executed by a Java° interpreter. A Java° interpreter is part of the Java° virtual machine that alternately decodes and interprets a bytecode or bytecodes. These bytecode instructions are designed to be easy to interpret on any computer and easily translated on the fly into native machine code. Byte codes may be translated into native code by a just-in-time (JIT) compiler.

A Java® virtual machine loads class files and executes the bytecodes within them. The class files are loaded by a class loader in the Java® virtual machine. The class loader loads class files from an application and the class files from the Java® application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java® bytecodes are executed natively. Java® virtual machines usually interpret bytecodes, but Java® virtual machines may also use other techniques, such as just-in-time compiling, to execute bytecodes.

When an application is executed on a Java® virtual machine that is implemented in software on a platform-specific operating system, a Java® application may interact with the host operating system by invoking native methods. A Java® method is written in the Java° language, compiled to bytecodes, and stored in class files. A native method is written in some other language and compiled to the native machine code of a particular processor. Native methods are stored in a dynamically linked library whose exact form is platform specific.

Figure 4:
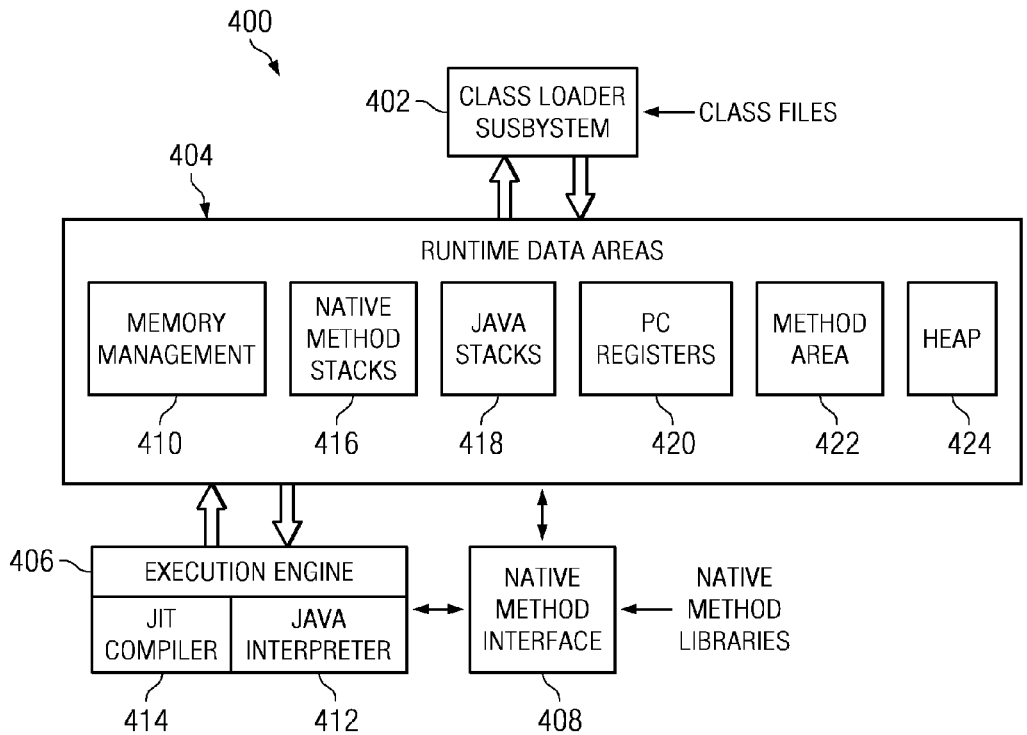
FIG. 4 is a block diagram of a Java® virtual machine in accordance with a illustrative embodiment.

With reference now to FIG. 4, a block diagram of a Java® virtual machine is depicted in accordance with a illustrative embodiment. Java® virtual machine (JVM) 400 includes class loader subsystem 402, which is a mechanism for loading types, such as classes and interfaces, given fully qualified names. Java® virtual machine 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java® interpreter 412 or just-in-time compiler 414. Native method interface 408 allows access to resources in the underlying operating system. Native method interface 408 may be, for example, the Java® Native Interface (JNI).

Runtime data areas 404 contain native method stacks 416, Java® stacks 418, PC registers 420, method area 422, and heap 424. These different data areas represent the organization of memory needed by Java® virtual machine 400 to execute a program.

Java® stacks 418 are used to store the state of Java® method invocations. When a new thread is launched, the Java® virtual machine creates a new Java® stack for the thread. The Java° virtual machine performs only two operations directly on Java° stacks. It pushes and pops frames. A thread's Java® stack stores the state of Java® method invocations for the thread. The state of a Java® method invocation includes its local variables, the parameters with which it was invoked, its return value, if any, and intermediate calculations. Java® stacks are composed of stack frames. A stack frame contains the state of a single Java® method invocation. When a thread invokes a method, the Java® virtual machine pushes a new frame onto the Java® stack of the thread. When the method completes, the Java® virtual machine pops the frame for that method and discards it. The Java® virtual machine does not have any registers for holding intermediate values; any Java® instruction that requires or produces an intermediate value uses the stack for holding the intermediate values. In this manner, the Java® instruction set is well-defined for a variety of platform architectures.

Program counter (PC) registers 420 are used to indicate the next instruction to be executed. Each instantiated thread gets its own PC register and Java® stack. If the thread is executing a Java® virtual machine method, the value of the PC register indicates the next instruction to execute. If the thread is executing a native method, then the contents of the PC register are undefined.

Native method stacks 416 stores the state of invocations of native methods. The state of native method invocations is stored in an implementation-dependent way in native method stacks, registers, or other implementation-dependent memory areas. In some Java® virtual machine implementations, native method stacks 416 and Java® stacks 418 are combined.

Method area 422 contains class data while heap 424 contains all instantiated objects. The constant pool is located in method area 422 in these examples. The Java® virtual machine specification strictly defines data types and operations. Most Java® virtual machines choose to have one method area and one heap, each of which are shared by all threads running inside the Java® virtual machine, such as Java® virtual machine 400. When Java® virtual machine 400 loads a class file, it parses information about a type from the binary data contained in the class file. Java° virtual machine 400 places this type of information into the method area. Each time a class instance or array is created, the memory for the new object is allocated from heap 424. Java® virtual machine 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

The illustrative embodiments herein describe a computer implemented method, a tangible storage medium, and a data processing system for building a runtime environment of a system. A profile manager receives a service request containing a profile identifier. The profile identifier specifies a required version of at least one software component. The profile manager identifies a complete installation of the software component, and at least one delta file. The profile manager dynamically constructs a classpath for the required version by preferentially utilizing files from the at least one delta file followed by files from the complete installation. The runtime environment is then built utilizing the classpath.

Illustrative embodiments provide a computer implemented method, system and computer program product for an application/profile to select a runtime environment version during runtime. According to an illustrative embodiment, an Enterprise application server fix pack upgrade functions like a virtual installation and does not upgrade the Enterprise application server version as a whole. Instead, both a current version and the newer version should be present in the system after the upgrade such that either version can be selected during application startup or the profile startup phase.

According to a further illustrative embodiment, different runtime versions, including the base version and upgraded versions are kept in the system and are loaded dynamically based on the runtime election.

Figure 5:
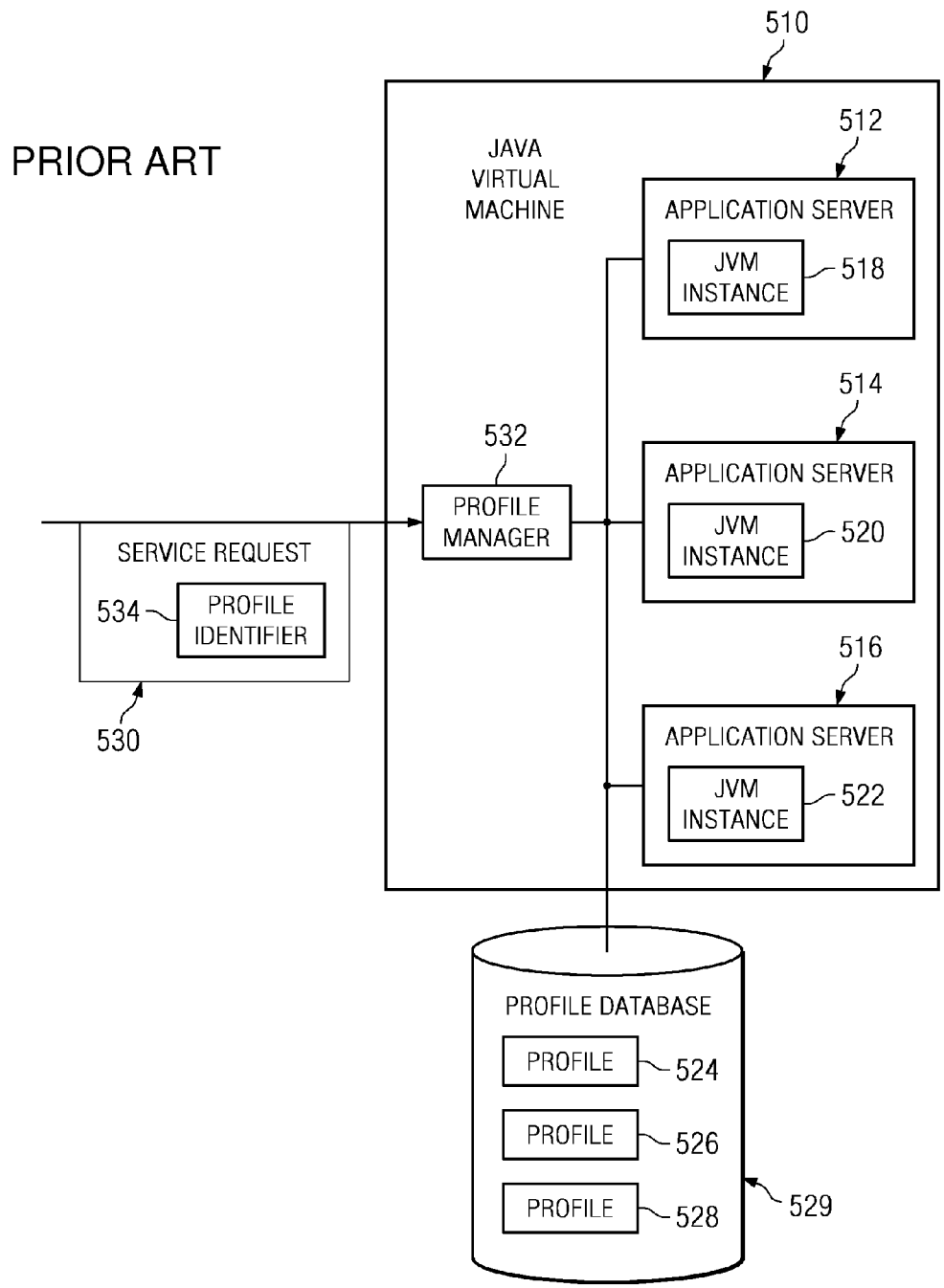
FIG. 5 is a current known dataflow diagram for provisioning profiles to a Java® virtual machine of a data processing system.

Referring now to FIG. 5, a known dataflow diagram for provisioning profiles to a Java® virtual machine of a data processing system is depicted. Java® virtual machine 510 is a Java® virtual machine such as Java® virtual machine 400 of FIG. 4. Java® virtual machine 510 installs and maintains different versions of the Enterprise application server in separate profiles of the same machine by maintaining complete installations for each of the separate profiles.

Java® virtual machine 510 contains application servers 512-516. Application servers 512-516 are the primary runtime component where applications of Java® virtual machine 510 actually execute.

Each of application servers 512-516 executes one of Java® virtual machine instances 518-522. Java® virtual machine instances 518-522 are class instances within Java® virtual machine 510. Several of Java® virtual machine instances 518-522 can separately execute within Java® virtual machine 510, so long as those instances are each contained within a separate application server, such as application servers 512-516.

Java® virtual machine instances 518-522 are created using one of profiles 524-528, stored in profile database 530. Profile database 529 is a data structure implemented on a storage unit, such as storage unit 108 of FIG. 1, that contains or references the location of profiles 524-528. Profiles 524-528 are separate data partitions that include the files that define a runtime environment for an application server process, such as a deployment manager or an application server. Each runtime environment has its own configuration files, logs, properties, and other attributes. Profiles 524-528 can make each runtime of application servers 512-516 unique and separate from the server binaries and from other profiles.

Each of profiles 524-528 is a complete enterprise application server installation, including any software patches and updates available at the time of which the profile is created. Each time one of profiles 524-528 is patched or updated, a new, separate profile is created. Therefore, in one illustrative embodiment, profile 524 is a complete installation of a milestone release of the enterprise application server. Profile 526 is a complete installation of the enterprise application server. Profile 526 is also a patched version of profile 524. Profile 528 is a complete installation of the Enterprise application server. Profile 528 is also a patched version of profile 526.

When Java® virtual machine 510 receives service request 530, profile manager 532 recognizes profile identifier 534. Profile identifier 534 is an indication of which version of the enterprise application server should be used to fulfill the request, and therefore which of profiles 524-528 should be utilized in creating a particular instance, such as one of Java® virtual machine instances 518-522. Profile manager 532 then retrieves the indicated one of profiles 524-528, and allocates that retrieved profile to the particular one of application servers 512-516 that is executing the instance.

Figure 6:
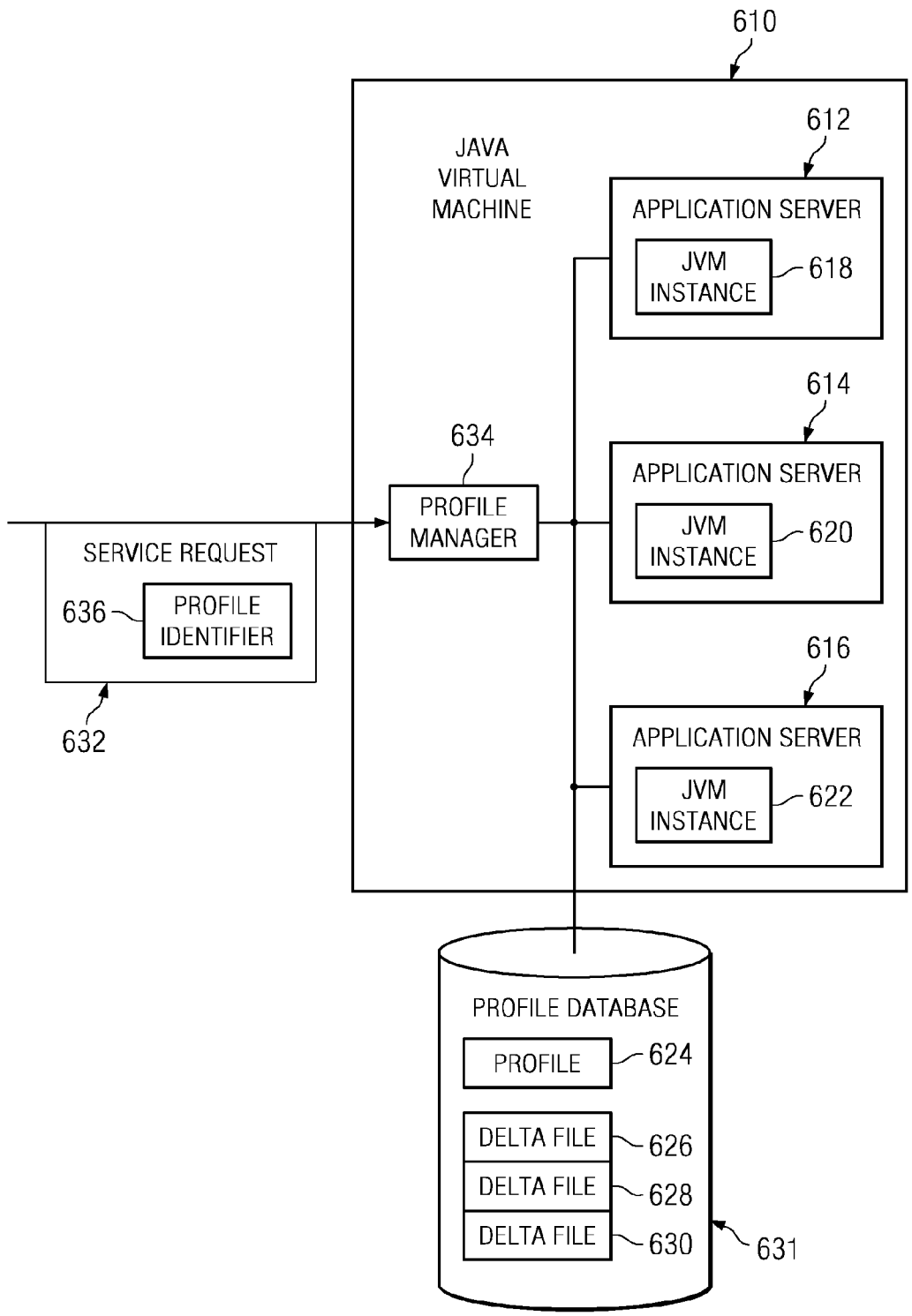
FIG. 6 is a dataflow diagram for provisioning profiles to a Java® virtual machine of a data processing system according to an illustrative embodiment.

Referring now to FIG. 6, a dataflow diagram for provisioning profiles to a Java® virtual machine of a data processing system is shown according to an illustrative embodiment. Java® virtual machine 610 is a Java® virtual machine such as Java® virtual machine 400 of FIG. 4. Java® virtual machine 610 installs and maintains different versions of the Enterprise application server and in the same machine separate profiles by maintaining delta files for each of the separate profiles.

Java® virtual machine 610 contains application servers 612-616. Application servers 612-616 are the primary runtime component where applications of Java® virtual machine 610 actually execute.

Each of application servers 612-616 executes one of Java® virtual machine instances 618-622. Java® virtual machine instances 618-622 are class instances within Java® virtual machine 610. Several of Java® virtual machine instances 618-622 can separately execute within Java® virtual machine 610, so long as those instances are each contained within a separate application server, such as application servers 612-616.

Java® virtual machine instances 618-622 are created using one of profile 624, and one or more of delta files 626-630, stored in profile database 631. Profile database 631 is a data structure implemented on a storage unit, such as storage unit 108 of FIG. 1, that contains or references the location of profile 624. Profile 624 is a separate data partition that includes the files that define a runtime environment for an application server process, such as a deployment manager or an application server. Each runtime environment has its own configuration files, logs, properties, and other attributes. Profile 624 can make each runtime of application servers 612-616 unique and separate from the server binaries and from other profiles.

Profile 624 is a complete enterprise application server installation. Unlike profiles 524-528 of FIG. 5, Profile 624 does not include any software patches and updates available at the time of which the profile is created. In one illustrative embodiment, profile 624 is a complete installation of a milestone release of the Enterprise application server.

Delta files 626-630 are files that contain either changes to a base profile, such as profile 624, or changes to a previous delta file, such as others of delta files 626-630. For any software patch or update that is to be applied to profile 624, the changes to be enacted to profile 624 are not initially applied to profile 624, but instead saved as one of delta files 626-630.

In one illustrative embodiment, each of delta files 626-630 is a software patch or update that contains changes to be enacted to profile 624. When profile 624 is dynamically loaded into one of application servers 612-616, the classpath is constructed first with files from the identified delta files 626-630, followed by files from the base profile 624.

In one illustrative embodiment, each of delta files 626-630 is a sequential software patch or update that contains changes to be enacted to profile 624 as modified by a previous one of delta files 626-630. For example, but not limited to, delta file 626 may be a first update to profile 624, such that the software patch or update of delta file 626 is to be applied directly to profile 624. Delta file 628 may be a subsequent update to profile 624, such that the software patch or update of delta file 628 is to be applied to profile 624 as modified by delta file 626. Delta file 630 may be yet a further subsequent update to profile 624, such that the software patch or update of delta file 628 is to be applied to profile 624 as modified by both delta file 626 and delta file 628. Therefore, if service request 632 identifies a profile version that includes each of delta files 626-630, the classpath is constructed first with files from delta file 630, followed by files from delta file 628, followed by files from delta file 626, followed by files from the base profile 624.

When Java® virtual machine 610 receives service request 632, profile manager 634 recognizes profile identifier 636. Profile identifier 636 is an indication of which version of the Enterprise application server should be used to fulfill the request, and therefore which of delta files 626-630 should be utilized along with profiles 624 in creating a particular instance, such as one of Java® virtual machine instances 618-622. Profile manager 634 then retrieves the indicated ones of delta files 626-630 along with profile 624, and allocates that retrieved profile to the particular one of application servers 612-616 that is executing the instance.

Illustrative embodiments provide a computer implemented method, system and computer program product for an application/profile to select a runtime environment version during runtime. According to an illustrative embodiment, an Enterprise application server fix pack upgrade functions like a virtual installation and does not upgrade the enterprise application server version as a whole. Instead, both a current version and the newer version should be present in the system after the upgrade such that either version can be selected during application startup or the profile startup phase.

According to a further illustrative embodiment, different runtime versions, including the base version and upgraded versions are kept in the system and are loaded dynamically based on the runtime election.

Figure 7:
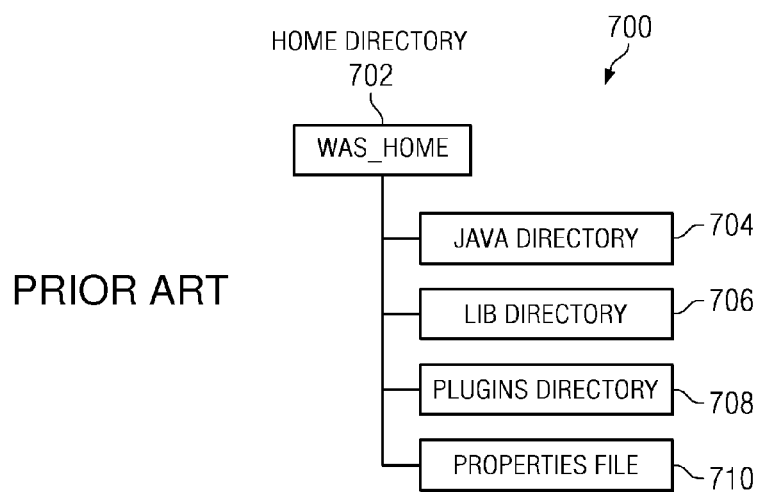
FIG. 7 is a block diagram that schematically illustrates an Enterprise application server file system structure according to the prior art.

Referring now to FIG. 7, a block diagram that schematically illustrates an enterprise application server file system structure is shown according to the prior art. File structure 700 is an organization of the file system structure of the EAS so that a base version and multiple other complete installations of the runtime files can be kept in the enterprise application server home directory. File structure 700 is a schematic representation of a file system containing profiles, such as profiles 524-528 of FIG. 5.

File structure 700 includes a home directory 702. Home directory 702 can be, for example, but is not limited to the \WebSphere\AppServer WAS_HOME directory when the enterprise application server is a WebSphere® Application Server. Websphere® is a registered trademark of International Business Machines Corporation. The \profiles directory lists the various profiles, however, the other directories and files of WebSphere, for example, Java® directory 704, lib directory 706, plugins directory 708 and properties file 710, are all at the WAS_HOME level. When an upgrade to the Enterprise application server is made, for example, to upgrade from version 6.1.0.0 to version 6.1.0.25, each of the files, for example, files inside Java® directory 704, lib directory 706, plugins directory 708 and properties file 710, will all be changed to reflect the upgrade.

If the upgrade to the Enterprise application server is saved as a different file name, then File structure 700 can maintain complete copies of both the upgraded Enterprise application server, and the original enterprise application server. If the upgrade to the Enterprise application server is not saved as a different file name, files for the original version of the enterprise application server will be replaced and lost.

Figure 8:
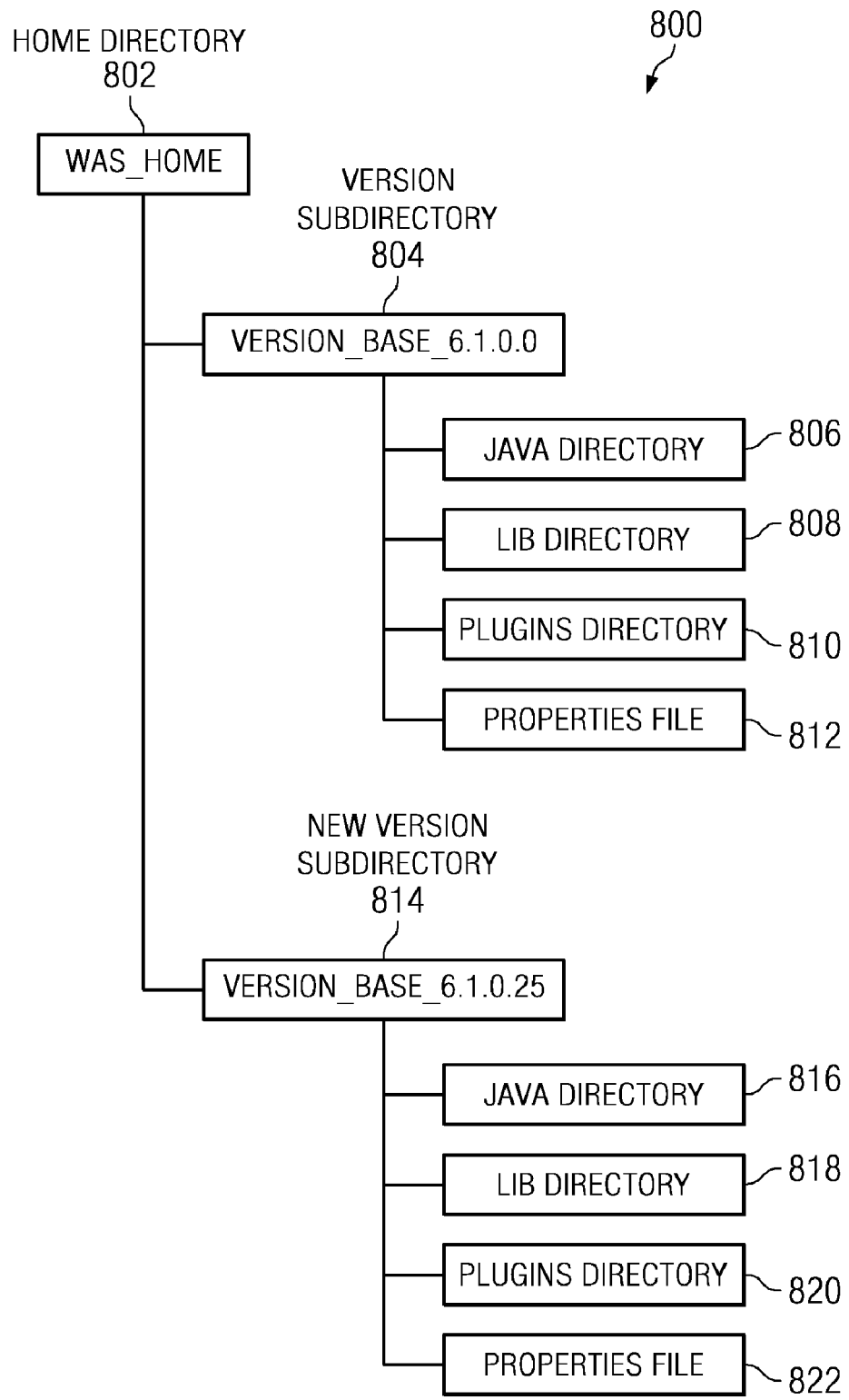
FIG. 8 is a block diagram that schematically illustrates an Enterprise application server file system structure according to an illustrative embodiment.

Referring now to FIG. 8, a block diagram that schematically illustrates an Enterprise application server file system structure is shown according to an illustrative embodiment. File structure 800 is an organization the file system structure of the Enterprise application server so that a base version and multiple other complete installations of the runtime files can be kept in the enterprise application server home directory. File structure 800 is a schematic representation of a file system containing profiles and delta files, such as profiles 624 and delta files 626-630 of FIG. 6.

File structure 800 includes a home directory 802. Home directory 802 can be, for example, but is not limited to the \WebSphere\AppServer WAS_HOME directory when the Enterprise application server is a WebSphere® Application Server. Websphere® is a registered trademark of International Business Machines, Inc.

Home directory 802 initially contains version subdirectory 804. For each patch or software upgrade of enterprise application server that is installed, a new version subdirectory is added to home directory 802. Home directory 802 lists the various profiles. Each of the various profiles includes other files of the Enterprise application server, for example, Java® directory 806, lib directory 808, plugins directory 810 and properties file 812. The other files are installed at the WAS_HOME\Version_base_6.1.0.0 level.

When an upgrade to the Enterprise application server is made, new version subdirectory 814 is created. For example, an upgrade from version 6.1.0.0 to version 6.1.0.25, \version_base-6.1.0.0 directory is added to contain the runtime directory files, such as, for example, but not limited to Java® directory 816, lib directory 818, plugins directory 820, and properties file 822, such that both version 6.1.0.0 and version 6.1.0.25 are stored within the file system.

In one illustrative embodiment, the runtime directory files, such as, for example, but not limited to Java® directory 816, lib directory 818, plugins directory 820, and properties file 822, are delta files, such as one of delta files 624-628 of FIG. 6. The runtime directory files, such as, for example, but not limited to Java® directory 816, lib directory 818, plugins directory 820, and properties file 822 are changes to the Enterprise application server from the previous Java° directory 806, lib directory 808, plugins directory 810 and properties file 812.

When a fixpack, patch, or upgrade is applied to the Enterprise application server, the fixpack, patch, or upgrade can be either a "milestone upgrade" or a non-milestone" upgrade. If a "milestone" upgrade is selected, a new \version_delta_6.1.0.25 is created that contains the updated set of files. For example, to upgrade from version 6.1.0.0 to version 6.1.0.25, delta files for the runtime directory files of version 6.1.0.0 for example, Java® directory 816, lib directory 818, plugins directory 820, and properties file 822, will be stored in new version subdirectory 814.

A non-milestone installation is a complete installation of a complete version level containing all of the file and directories of the Enterprise application server. In a non-milestone installation, the entire Enterprise application server system is upgraded to a newer version. In contrast, a milestone installation is a partial installation of a version level that depends on one or more other installation directories and presumably at least one complete base profile/installation directory. In a milestone installation, the old and new file versions are preserved. The new file versions are stored as delta files, such as one of delta files 626-630 of FIG. 6.

If a "non-milestone" upgrade is selected, when the upgrade occurs, the runtime directory files, are simply overwritten such that only upgraded version is present within the file structure.

When an application server, such as one of application servers 612-616 of FIG. 6, is started, the Java® virtual machine instance is started with the proper profile. The classpath for the virtual machine instance is constructed and contains files from version_delta_6.1.0.25 first, followed by files from version_base_6.1.0.0. Some state data files, for example, those in the properties subdirectory, may be replicated in their entirety, if necessary, so that they are consistent. A particular profile can be started in combination with a particular delta file. The enterprise application server runtime, is backfilled with the base profile, or potentially, another delta file.

In this way, the ability to run a profile on a previous version of the Enterprise application server is preserved as well as on later versions without having to completely duplicate all the files.

Figure 9:
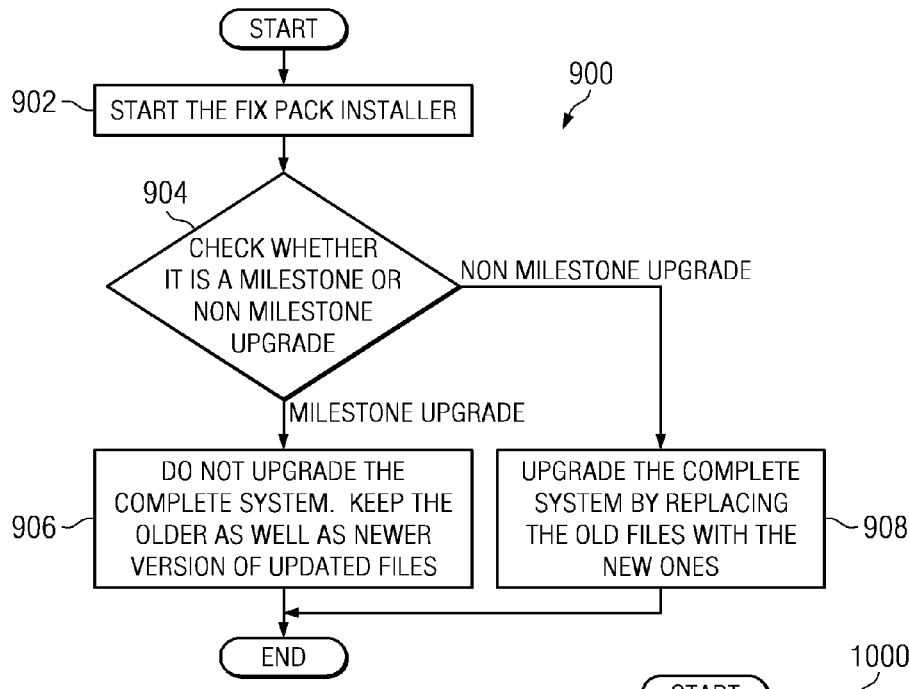
FIG. 9 is a block diagram that schematically illustrates an installation of an Enterprise application server upgrade, patch, or fixpack according to an illustrative embodiment.

FIG. 9 is a block diagram that schematically illustrates an installation of an Enterprise application server upgrade, patch, or fixpack according to an illustrative embodiment. Process 900 is a software process, executing on a software component, such as profile manager 634 of FIG. 6.

Process 900 begins by starting the installer for installing the upgraded version (Step 902). A determination is made whether the upgrade is a milestone upgrade (Step 904). Responsive to determining that the upgrade is a milestone upgrade (Yes output of Step 904), the upgrade is installed while retaining all previous versions of the files that are updated by the upgrade (Step 906). Responsive to determining that the upgrade is not a milestone upgrade (No output of Step 904), the upgrade is installed such that the complete system of WAS is upgraded by replacing files for previous versions with files for the upgraded version (Step 908).

Figure 10:
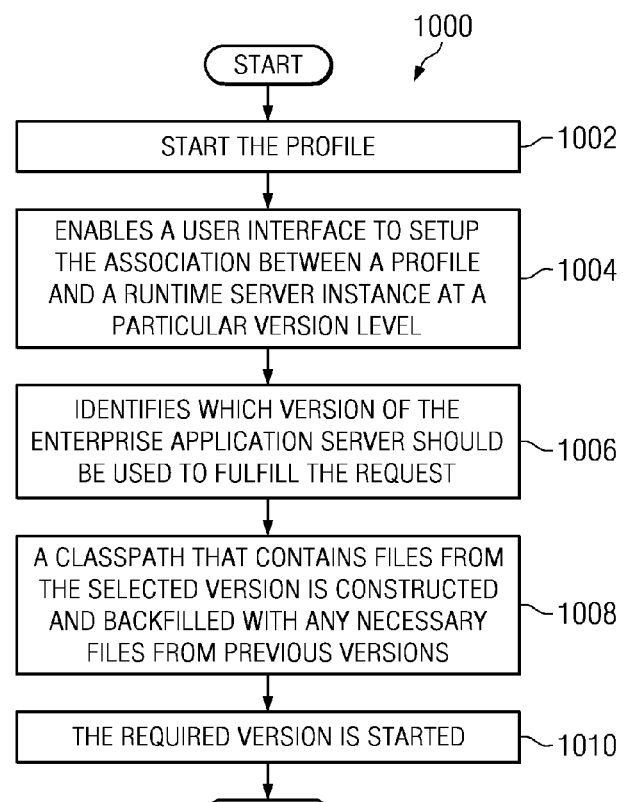
FIG. 10 is a flowchart that schematically illustrates a method for selecting a system version by runtime environments according to an illustrative embodiment.

FIG. 10 is a flowchart that schematically illustrates a method for selecting a system version by runtime environments according to an illustrative embodiment. Process 1000 is a software method, executing on a software process, such as profile manager 634 of FIG. 6. Process 1000 assumes that each node in a cluster has had the same update installer packages installed and that those packages were installed in a consistent manner. Accordingly, if the existing profile tool is enhanced to update the association between a profile and the runtime, and pushed out using the node agents to all nodes, then this association can be easily done. A file, for example, in profiles\AppSrv01\config\cells\cellName\nodes\nodeName\runtime version.xml could be introduced to store the association.

Process 1000 begins by starting the profile (Step 1002). Process 1000 enables a user interface to setup the association between a profile and a runtime server instance at a particular version level (Step 1004).

Process 1000 identifies which version of the Enterprise application server should be used to fulfill the request (Step 1006). Process 1000 makes the identification based on a profile identifier, such as profile identifier 636 of FIG. 6. A classpath that contains files from the selected version is constructed, and backfilled with any necessary files from previous versions (step 1008). For example, a version 6.1.0.25 is indicated by the profile identifier. A version-base-6.1.0.0 is then used to backfill version 6.1.0.25 with any necessary files not contained in version 6.1.0.25. The required version is started (Step 1010), with the process terminating thereafter.

Thus, the illustrative embodiments provide a computer implemented method, a tangible storage medium, and a data processing system for building a runtime environment of a system. A profile manager receives a service request containing a profile identifier. The profile identifier specifies a required version of at least one software component. The profile manager identifies a complete installation of the software component, and at least one delta file. The profile manager dynamically constructs a classpath for the required version by preferentially utilizing files from the at least one delta file followed by files from the complete installation. The runtime environment is then built utilizing the classpath.

Illustrative embodiments provide a computer implemented method, system and computer program product for an application/profile to select a runtime environment version during runtime. According to an illustrative embodiment, an Enterprise application server fix pack upgrade functions like a virtual installation and does not upgrade the Enterprise application server version as a whole. Instead, both a current version and the newer version should be present in the system after the upgrade such that either version can be selected during application startup or the profile startup phase.

According to a further illustrative embodiment, different runtime versions, including the base version and upgraded versions are kept in the system and are loaded dynamically based on the runtime election.

The matching of a profile to a runtime environment can be made by a profile manager tool, or by editing some deployment descriptor at the top of the profile. A corresponding profile on each node of the node cluster may need to be matched to a corresponding runtime version on each node of a cluster.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for building a runtime environment of a system, the computer implemented method comprising:
   receiving by a processor, a service request containing a profile identifier, wherein the profile identifier specifies a profile to be used to create a required instance of at least one software component needed to fulfill the service request, wherein the required instance of the at least one software component is a complete installed version of an application server process in a particular runtime environment;
   identifying by the processor, from a database of profiles, a required profile that specifies a complete installation of the software component based on the requested profile identifier wherein the identified required profile is a data partition containing information associated with a complete installation of an application server process and all separately associated delta files that update the required profile and are associated to the profile;
   dynamically constructing by the processor, a classpath for the required profile by preferentially utilizing files from the at least one delta file first, and then followed by files from the identified required profile; and
   building by the processor, the particular application server process utilizing the classpath and allocating the particular application server process within the runtime environment.

2. The computer implemented method of claim 1, wherein the at least one delta file further comprises a first delta file and a second delta file, wherein the first delta file is an earlier update to the complete installation, and wherein the second delta file is a subsequent update to the complete installation, wherein the step of dynamically constructing a classpath for the required version by preferentially utilizing files from the at least one delta file followed by files from the complete installation further comprises:
   applying by a processor, files and directories in the second delta file;
   responsive by a processor, to applying the files and the directories in the second delta file, applying files and directories in the first delta file; and
   responsive to applying the files and the directories in the first delta file, applying by a processor, files and directories in the complete installation.

3. The computer implemented method of claim 1, wherein the particular runtime environment comprises one of a plurality of runtime environments in the system, each runtime environment being implemented in a separate instance of an object oriented program virtual machine.

4. The computer implemented method of claim 3, wherein ones of the plurality of runtime environments utilize different ones of the at least one delta file, such that the ones of the plurality of runtime environments have their own configuration files, logs, and properties.

5. The computer implemented method of claim 1, wherein the runtime environment comprises a object oriented program code runtime environment, and wherein the classpath is specified by the logically overlaying any of a plurality of object oriented program code software components with object oriented program code classes specified in the user profile at the required version, and wherein the profile identifier in the service request specifies required object oriented program code class version.

6. The computer implemented method of claim 1, wherein the profile identifier specifies the arrangement hierarchy for logically overlaying the complete installation of the software component, and the at least one delta file.

7. The computer implemented method of claim 1, wherein the complete installation of the software component is a complete installation of an enterprise application server.

8. The computer implemented method of claim one, wherein the at least one delta file further comprises a first delta file and a second delta file, wherein the first delta file is an earlier update to the complete installation, and wherein the second delta file is a subsequent update to the complete installation, the method further comprising:

receiving by the processor, the service request containing the profile identifier, wherein the profile identifier specifies the required version of the at least one software component, wherein the required version is a patched version of the complete installation consisting of the complete installation in the first delta file;

responsive to receiving the service request containing the profile identifier wherein the profile identifier specifies the required version of the at least one software component, wherein the required version is the patched version of the complete installation consisting of the complete installation in the first delta file, applying files and directories in the first delta file without applying files and directories in the second file; and responsive to applying the files and the directories in the first delta file, applying by the processor, files and directories in the complete installation.

\* \* \* \* \*